(12) United States Patent
Yang et al.

(10) Patent No.: US 11,728,492 B2
(45) Date of Patent: Aug. 15, 2023

(54) ATOMICALLY DISPERSED PRECURSOR FOR PREPARING A NON-PLATINUM GROUP METAL ELECTROCATALYST

(71) Applicant: The Board of Trustees of the University of Illinois, Urbana, IL (US)

(72) Inventors: Hong Yang, Champaign, IL (US); Talha Al-Zoubi, Urbana, IL (US); Yu Zhou, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 515 days.

(21) Appl. No.: 16/720,518

(22) Filed: Dec. 19, 2019

(65) Prior Publication Data

US 2020/0203734 A1    Jun. 25, 2020

Related U.S. Application Data

(60) Provisional application No. 62/783,798, filed on Dec. 21, 2018.

(51) Int. Cl.
*H01M 4/90* (2006.01)
*H01M 4/86* (2006.01)

(52) U.S. Cl.
CPC ....... *H01M 4/9083* (2013.01); *H01M 4/8652* (2013.01)

(58) Field of Classification Search
CPC ....... Y02E 60/50; H01M 4/96; H01M 4/9083; H01M 4/8652; H01M 4/886; H01M 4/9008; H01M 4/8807; H01M 2008/1095

USPC .......................................................... 502/180
See application file for complete search history.

(56) References Cited

U.S. PATENT DOCUMENTS 4,138,388 A * 2/1979 Pennekamp ............. C08K 3/24
524/88

FOREIGN PATENT DOCUMENTS

| CN | 102516274 B | 6/2012 | |
|---|---|---|---|
| CN | 107286185 A | 10/2017 | |
| CN | 107930672 A * | 4/2018 | ............. B01J 27/24 |
| CN | 108484415 A | 9/2018 | |
| WO | WO-2017052474 A1 * | 3/2017 | ............. B82B 1/007 |

OTHER PUBLICATIONS

Jagadeesh et al., MOF-derived cobalt nanoparticles catalyze a general synthesis of amines, Oct. 2017, Science, vol. 358, pp. 326-332 (Year: 2017).*

(Continued)

*Primary Examiner* — Stefanie J Cohen
*Assistant Examiner* — Ritu S Shirali
(74) *Attorney, Agent, or Firm* — Crowell & Moring LLP

(57) ABSTRACT

An atomically dispersed precursor (ADP) for preparing a non-platinum group metal electrocatalyst includes: sacrificial metal centers comprising a sacrificial metal selected from Cd and Zn; metal active sites comprising a transition metal; and first and second ligands linking the sacrificial metal centers and the metal active sites into a network. The ADP may be immobilized on a carbon support. The first and second ligands may comprise N-containing ligands of different carbon chain lengths. Alternatively, the first and second ligands may comprise N-containing ligands and O-containing ligands, respectively.

12 Claims, 9 Drawing Sheets

(56) References Cited

OTHER PUBLICATIONS

Chen et al., Cobalt sulfide/N,S-codoped defect-rich carbon nanotubes hybrid as an excellent bi-functional oxygen electrocatalyst, Dec. 18, 2018, Nanotechnology, vol. 30, pp. 1-10 (Year: 2018).*

Abdelkareem et al., Ni—Cd carbon nanofibers as an effective catalyst for urea fuel cell, Feb. 2018, Journal of Environmental Chemical Engineering, vol. 6, pp. 332-337 (Year: 2018).*

Fuel Cell: Carbon Black-Vulcan XC 72R [online], [retrieved on Jan. 25, 2022]. Retrieved from the internet:< URL: https://www.fuelcellstore.com/vulcan-xc-72r> (Year: 2022).*

SubsTech: Classification of Carbon Materials [online], [retrieved on Jan. 25, 2022], Retrieved from the internet:< URL: http://www.idc-online.com/technical_references/pdfs/chemical_engineering/Classification_of_carbon_materials.pdf> (Year: 2022).*

Machine translation of CN 107930672 A originally published Apr. 2018 to Jia et al. (Year: 2018).*

Armel et al., "Structural Descriptors of Zeolitic-lmidazolate Frameworks are Keys to the Activity of Fe—N—C Catalysts," *Journal of the American Chemical Society*, 139 (2017) pp. 453-464.

Chung et al., "Direct atomic-level insight into the active sites of a high-performance PGM-free ORR catalyst," *Science*, 357 (2017) pp. 479-484.

Debe, "Electrocatalyst approaches and challenges for automotive fuel cells," *Nature*, 486 (2012) pp. 43-51.

Gewirth et al., "Nonprecious Metal Catalysts for Oxygen Reduction in Heterogeneous Aqueous Systems," *Chemical Reviews*, 118 (2018) pp. 2313-2339.

Li et al., "Carbon-based electrocatalyst derived from bimetallic metal-organic framework arrays for high performance oxygen reduction," *Nano Energy* 25 (2016) pp. 100-109.

Li et al., "Directed Growth of Metal-Organic Frameworks and Their Derived Carbon-Based Network for Efficient Electrocatalytic Oxygen Reduction," *Advanced Materials*, 28 (2016) pp. 2337-2344.

Martinez et al., "Progress in the Development of Fe-Based PGM-Free Electrocatalysts for the Oxygen Reduction Reaction," *Advanced Materials*, 31, 1806545 (2019) pp. 1-20.

Tang et al., "Metal-Organic-Framework-Derived Dual Metal- and Nitrogen-Doped Carbon as Efficient and Robust Oxygen Reduction Reaction Catalysts for Microbial Fuel Cells," *Advanced Science*, 3, 15000265 (2016) pp. 1-8.

Wang et al., "An efficient Co—N—C oxygen reduction catalyst with highly dispersed Co sites derived from a ZnCo bimetallic zeolitic imidazolate framework," *RSC Advances*, 6 (2016) pp. 37965-37973.

Wang et al., "Directly converting Fe-doped metal-organic frameworks into highly active and stable Fe—N—C catalysts for oxygen reduction in acid," *Nano Energy*, 25 (2016) pp. 110-119.

Wu et al., "High-Performance Electrocatalysts for Oxygen Reduction Derived from Polyaniline, Iron, and Cobalt," *Science*, 332 (2011) pp. 443-447.

Wu et al., "Nanostuctured Precious Metal Catalysts for Oxygen Reduction Reaction," *Accounts of Chemical Research*, 46 (2013) pp. 1878-1889.

Yin et al., "Single Cobalt Atoms with Precise N-Coordination as Superior Oxygen Reduction Reaction Catalysts," *Angew Chem Int. Ed.*, 55 (2016) pp. 10800-10805.

Zhang et al., "Networking Pyrolyzed Zeolitic Imidazolate Frameworks by Carbon Nanotubes Improves Conductivity and Enhances Oxygen-Reduction Performance in Polymer-Electrolyte-Membrane Fuel Cells," *Advanced Materials*, 29, 1604556 (2017) pp. 1-7.

Zhang et al., "Single Atomic Iron Catalysts for Oxygen Reduction in Acidic Media: Particle Size Control and Thermal Activation," *Journal of the American Chemical Society* 139 (2017) pp. 14143-14149.

Zitolo et al., "Identification of catalytic sites for oxygen reduction in iron- and nitrogen-doped graphene materials," *Nature Materials*, 14 (2015) pp. 937-942.

* cited by examiner

US 11,728,492 B2

ATOMICALLY DISPERSED PRECURSOR FOR PREPARING A NON-PLATINUM GROUP METAL ELECTROCATALYST

RELATED APPLICATION

The present patent document claims the benefit of priority under 35 U.S.C. § 119(e) to U.S. Provisional Patent Application No. 62/783,798, which was filed on Dec. 21, 2018, and is hereby incorporated by reference in its entirety.

TECHNICAL FIELD

The present disclosure is related generally to the fabrication of electrocatalysts for the oxygen reduction reaction, and more specifically to synthesizing non-platinum group metal electrocatalysts.

BACKGROUND

Proton-exchange membrane fuel cells (PEMFCs) convert chemical energy stored in hydrogen ($H_2$) into electrical energy. These devices are both energy efficient and environmentally-friendly, making them appealing for automotive transportation and other applications. A main challenge hindering the large-scale commercialization of hydrogen-powered PEMFC vehicles is the high cost of platinum group metal (PGM) catalysts used for the oxygen reduction reaction (ORR). Development of non-PGM electrocatalysts thus has become an important focus in recent years. The chemical makeup of most known non-PGM catalysts includes carbon, nitrogen, and an active metal element, such as Fe, Co or Mn. Their structural and chemical properties may play critical roles in determining ORR performance.

Metal-organic frameworks (MOFs) such as zeolitic imidazolate framework ("ZIF-8"), which are considered as a class of atomically dispersed precursor, have been explored for synthesizing non-PGM electrocatalysts. Upon thermal treatment, the organic component of such MOFs may decompose into a carbon matrix that includes the active metal element, forming an electrocatalyst. Typically, however, the electrocatalyst exhibits a high level of heterogeneity, with nanoclusters of the active metal element or metal carbides or metal nitrides forming together with the single atom catalytic sites, leading to non-PGM electrocatalysts with insufficient catalytic activity or stability.

BRIEF SUMMARY

An atomically dispersed precursor (ADP) for preparing a non-platinum group metal electrocatalyst includes: sacrificial metal centers comprising a sacrificial metal selected from Cd and Zn; metal active sites comprising a transition metal; and first and second ligands linking the sacrificial metal centers and the metal active sites into a network. The ADP may be immobilized on a carbon support. The first and second ligands may comprise N-containing ligands of different carbon chain lengths. Alternatively, the first and second ligands may comprise N-containing ligands and O-containing ligands, respectively.

DETAILED DESCRIPTION

A new atomically dispersed precursor (ADP) has been developed to synthesize non-platinum group metal (non-PGM) electrocatalysts with highly dispersed metal active sites and consequently high catalytic activity.

Figure 1A:
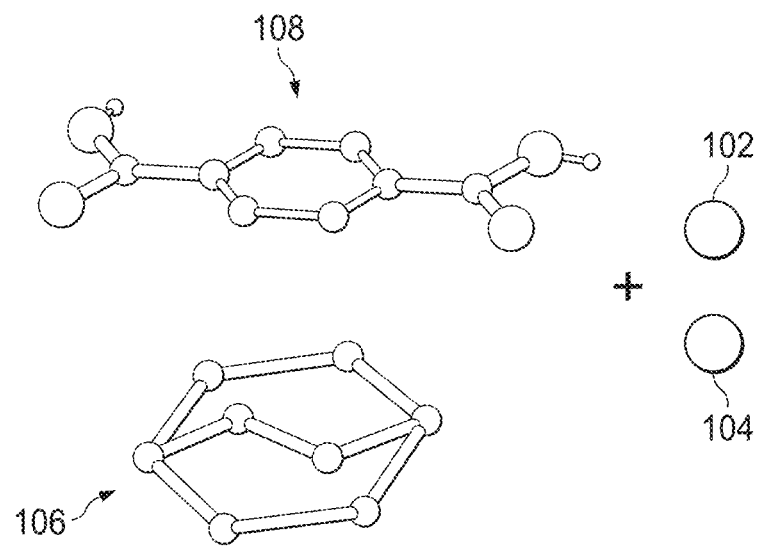
FIGS. 1A-1D are schematics of a method to form a non-platinum group metal electrocatalyst from an atomically dispersed precursor (ADP).
Figure 1B:
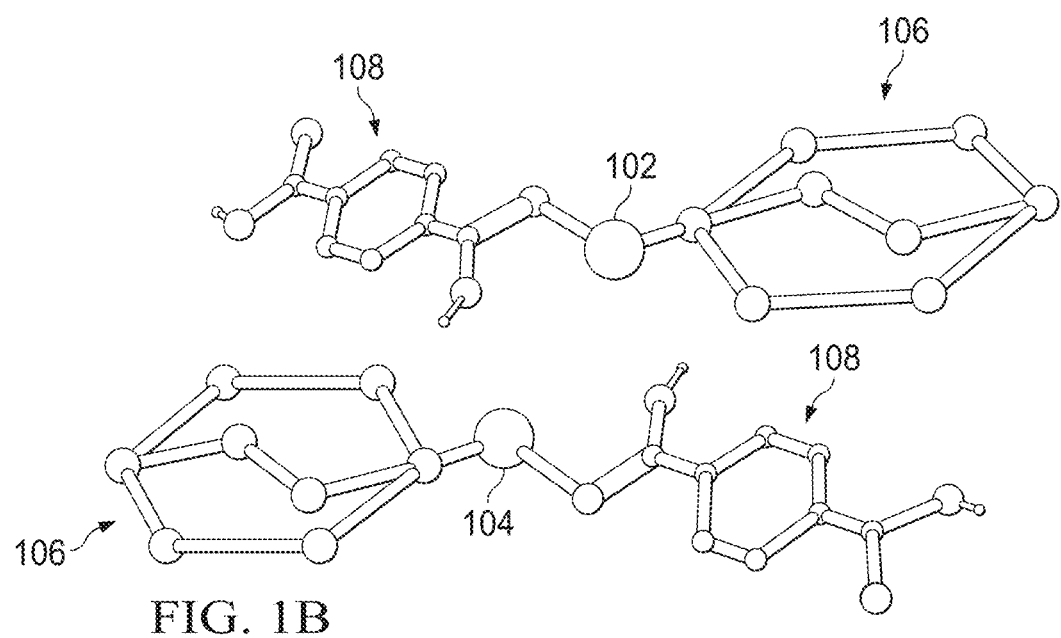

Referring to FIGS. 1A and 1B, the ADP 100 for preparing non-PGM electrocatalysts includes sacrificial metal centers 102 comprising a sacrificial metal such as Cd or Zn, metal active sites 104 comprising a transition metal (or "active metal") such as Fe, Co, or Mn, and first and second ligands 106,108 linking the sacrificial metal centers 102 and the metal active sites 104 into a network 110. Notably, the sacrificial metal centers 102 may include more than one sacrificial metal, such as both Cd and Zn, and the metal active sites 104 may include more than one transition metal.

In this work, the ADP may be immobilized on a conductive (e.g., carbon) support 112. More specifically, referring to FIG. 1C, a plurality of crystals of the ADP 100 may be immobilized on the support 112. The inset figure schematically illustrates the atomic framework of part of an immobilized crystal of the ADP 100. Immobilization of the ADP 100 prior to thermal treatment may significantly enhance the dispersion of the metal active sites 104 in the synthesized non-PGM electrocatalyst. The optional carbon support may comprise crystalline carbon, graphite, graphene, graphene oxide, carbon nanotubes, atom-doped carbon, N-doped carbon, amorphous carbon, and/or mesoporous carbon.

Figure 1C:
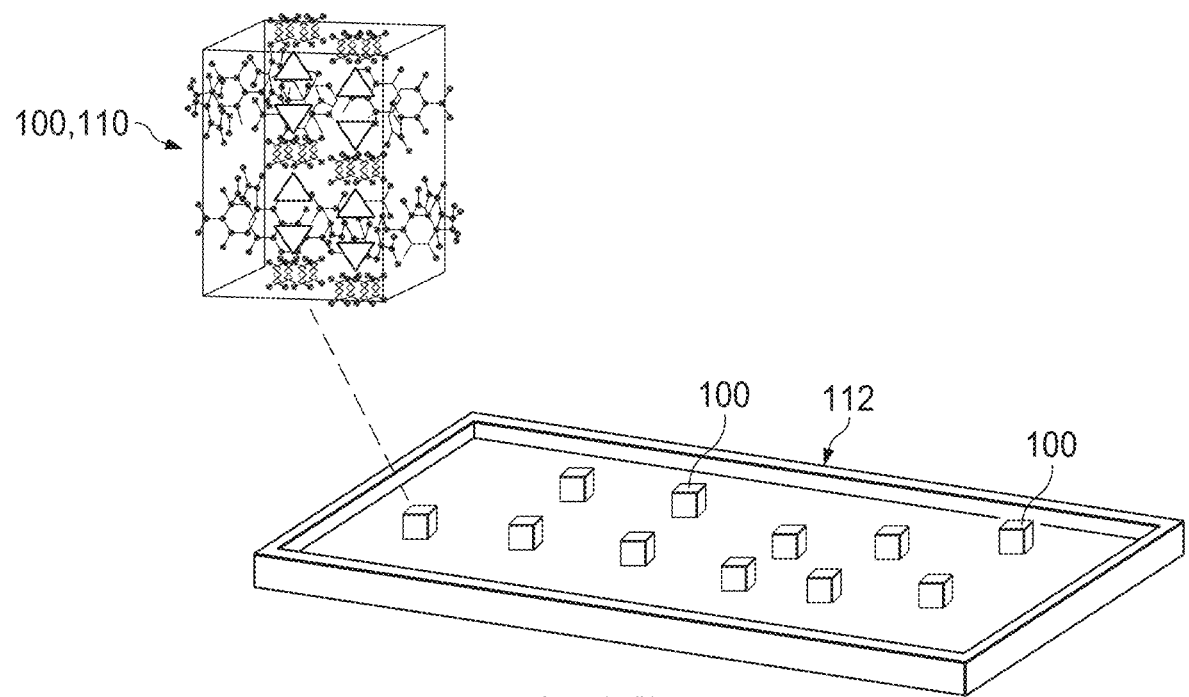
Figure 1D:
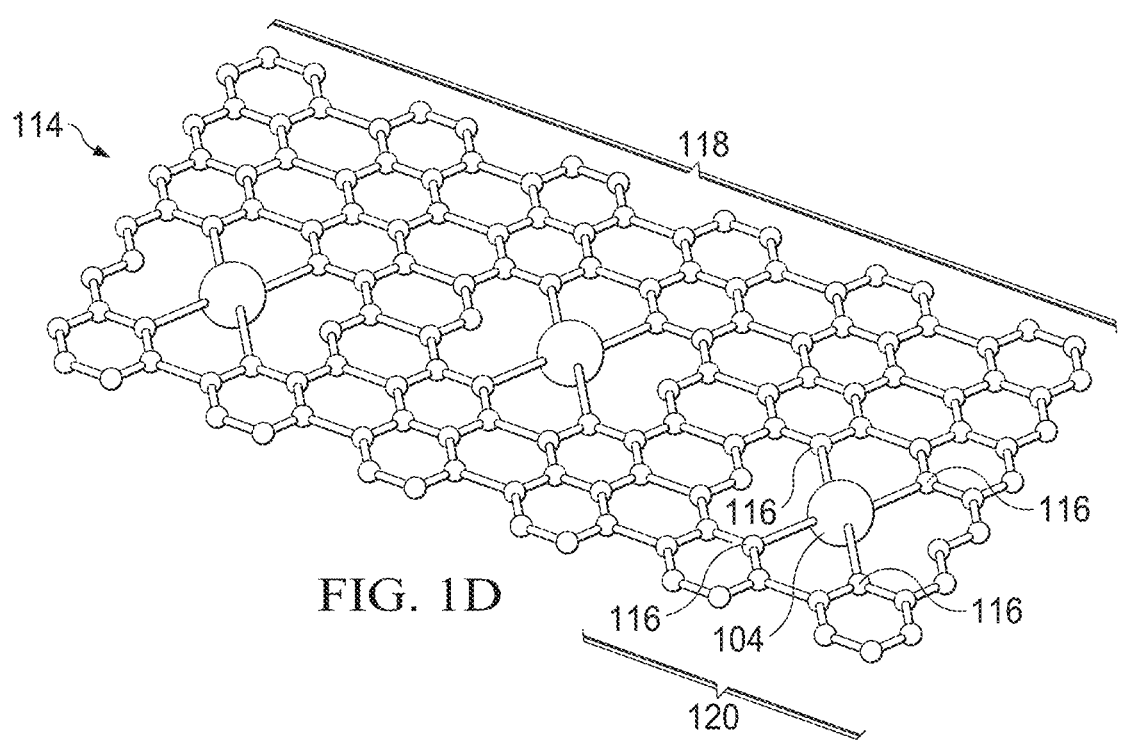

During the thermal treatment described below, the sacrificial metal centers 102 are largely or entirely removed (e.g., by evaporation), yielding a non-PGM electrocatalyst 114 comprising metal active sites (e.g., Fe atoms) 104 coordinated with at least one nitrogen atom 116 in a carbon matrix 118, as illustrated in FIG. 1D, where the sacrificial metal is present in an amount of about 0.5 wt. % or less.

Cd and Zn are suitable as sacrificial metals due at least in part to their relatively low boiling points (e.g., about 767° C. (Cd) and 910° C. (Zn); for comparison, the boiling point of Fe is about 2870° C.). Zn has been used previously as a sacrificial metal in conventional MOFs, although in prior investigations the desired active metal dispersion has not been achieved in the synthesized catalyst. Given that the boiling point of Cd is about 140° C. lower than that of Zn, it is postulated that sintering may be avoided during a relatively low temperature pyrolysis step using Cd instead of Zn, thereby enhancing production of single atom active sites.

Notably, in this work, using Cd or Zn as the sacrificial metal, a dual-ligand ADP 100 (including the first and second ligands 106, 108) is employed along with an optional immobilization step, as illustrated in FIG. 1C, prior to the thermal treatment. The ligands 106,108 may function as bridge connectors to enhance the interaction between the ADP and the optional carbon support 112. This novel approach to non-PGM electrocatalyst synthesis may increase the distance between the metal active sites 104 in the final electrocatalyst 114 to achieve ultra-high utilization of atomically-dispersed active sites. For example, the active metal may be present in the non-PGM electrocatalyst in an amount less than 5 wt. % loading, less than 3 wt. %, or even less than 1 wt. %. Typically, the loading of the active metal is in a range of 1-5 wt. % or 1-3 wt. %. Although the final electrocatalyst 114 contains little to none of the sacrificial metal, the presence of the sacrificial metal center 102 in the ADP 100 is important for determining the final catalytic structure.

The first ligands 106 of the dual-ligand ADP 100 may comprise N-containing ligands, or more specifically, N-, C-, and H-containing ligands. In one example, the first ligands 106 comprise 1,4-diazabicyclo[2.2.2]octane (DABCO), which has the chemical formula $C_6H_{12}N_2$ and is represented in the schematics of FIGS. 1A and 1B. In another example, the first ligands 106 may comprise bidentate N-containing ligands such as 1,10-phenanthroline, which has the chemical formula $C_{12}H_8N_2$. The second ligands 108 may comprise N-containing ligands having a different carbon chain length than the first ligands 106. Alternatively, the second ligands 108 may comprise O-containing ligands, or more specifically, O-, C-, and H-containing ligands. In one example, the second ligands 108 comprise an organic acid such as terephthalic acid (TPA), which has the chemical formula $C_6H_4(CO_2H)_2$ and is represented in the schematics of FIGS. 1A and 1B. In another example, the second ligands 108 may comprise N-containing ligands (N-, C-, and H-containing ligands) different from the first ligands 106, such as DABCO or 1,10-phenanthroline.

The ADP 100 may be fabricated from a mixture of ADP precursors comprising the first ligands (e.g., N-containing ligands) 106 and the second ligands (e.g., O-containing ligands or N-containing ligands) 108 referred to above, an active metal salt (e.g., Fe salt, Co salt, Mn salt, or other transition metal salt), and a Zn salt, such as zinc nitrate, zinc chloride, and/or zinc sulfate. As indicated above, the term "transition metal" may be used alternately with "active metal" throughout this disclosure, and does not include Zn, which may be present as a sacrificial metal. Exemplary active metal salts may include transition metal nitrates, chlorides, acetates, acetylacetonates, and/or sulfates. For example, a suitable iron salt may comprise $Fe(NO_3)_3$. The mixture may be formed by ultrasonication or mechanical millling (e.g., ball milling). Accordingly, in one example, the first ligands 106 of the ADP 100 may comprise DABCO, the second ligands 108 may comprise TPA, the sacrificial metal centers 102 may comprise Zn, and the metal active sites 104 may comprise Fe.

The ADP 100 may alternatively be fabricated from a mixture of ADP precursors comprising the first ligands (e.g., N-containing ligands) 106 and the second ligands (e.g., O-containing ligands or N-containing ligands) 108 referred to above, an active metal salt (e.g., Fe salt, Co salt, Mn salt, or other transition metal salt), and a Cd salt, such as cadmium nitrate, cadmium chloride, and/or cadmium sulfate. Exemplary active metal salts may include transition metal nitrates, chlorides, acetates, acetylacetonates, and/or sulfates. For example, a suitable iron salt may comprise $Fe(NO_3)_3$. The mixture may be formed by ultrasonication or mechanical milling (e.g., ball milling). Accordingly, in one example, the first ligands 106 of the ADP 100 may comprise DABCO, the second ligands 108 may comprise TPA, the sacrificial metal centers 102 may comprise Cd, and the metal active sites 104 may comprise Fe.

The ADP 100 may have an orthorhombic or other faceted crystal morphology. Also, the ADP may have a high specific surface area of at least about 1000 $m^2$/g, such as in the range 1000-4000 $m^2$/g.

A method of preparing a non-PGM electrocatalyst may include optionally immobilizing crystals of the ADP 100 as described above on a carbon support 112, and thermally treating (pyrolyzing) the ADP 100 at a temperature in a range from about 650° C. to about 1200° C. Typically, pyrolysis of the ADP 100 takes place in a nitrogen-rich atmosphere (e.g., ammonia) or an inert gas atmosphere. During the pyrolysis, the carbon-containing ligands 106,108 decompose to form a carbon network 118. Thus, a non-platinum group metal electrocatalyst 114 comprising M—N bonds dispersed within a carbon matrix 118 may thereby be produced, where each M—N bond or M—N- and/or M—C- containing complex 120 comprises a metal active site 104 comprising an active metal ("M") atom (or cation) coordinated with at least one nitrogen atom 116, e.g., two N atoms, three N atoms, or four N atoms. The metal active site 104 may comprise an Fe atom, Co atom or Mn atom. In one example, the M—N complexes 120 may comprise pyridinic or pyrrolic species, which may be beneficial for catalytic activity, as discussed in the examples below.

The immobilizing may be accomplished by mixing crystals of the ADP 100 with carbon particles in an organic solvent, and then drying to remove the organic solvent, leaving the ADP crystals supported on the carbon support. In one example, the carbon particles may comprise carbon black. The organic solvent may comprise dimethylformamide (DMF). The mixing may entail ultrasonication or mechanical mixing, such as ball milling. The drying may be carried out under ambient conditions, such as at room temperature (20-25° C.) in air. Alternatively, the drying may entail heating at an elevated temperature above room temperature and/or in a controlled environment (e.g., inert gas atmosphere or vacuum).

After the pyrolysis, a non-PGM electrocatalyst for the reduction of oxygen is formed, where the non-PGM electrocatalyst may have any of the characteristics and/or properties set forth in this disclosure. The non-PGM electrocatalyst prepared by the method described herein includes M—N complexes dispersed within a carbon matrix, where each M—N complex comprises a metal active site comprising an active metal atom (e.g., M=Fe, Co, Ni, or Mn) coordinated with one or more nitrogen atoms. Preferably, due to the enhanced dispersion possible with this synthesis approach, the non-platinum group metal electrocatalyst 114 does not include iron or other metal nanoparticles, and instead includes single-atom metal active sites 104 coordinated with at least one nitrogen atom 116 in a carbon matrix 118, as illustrated in FIG. 1D, where the carbon matrix 118 may comprise graphene, graphite, and/or amorphous carbon. The use of an ADP 100 with a low concentration of the active metal—in conjunction with the dual-ligand structure and the optional carbon support—helps to prevent the metal active sites 104 from sintering and facilitates formation of an electrocatalyst 114 comprising a large population of single-atom metal active sites 104. In general, a high density of single-atom sites 104 where iron or another active metal atom is bound to nitrogen 116 is desirable for high ORR activity. In one example, the non-platinum group metal electrocatalyst 114 may comprise from about 1-5 wt. % M, or less than 1 wt. % M, where M may represent Fe, Co or Mn. The non-PGM catalyst may have a specific surface area of at least about 30 $m^2/g$, or preferably at least about 400 $m^2/g$.

In an example where the first ligands 106 of the ADP 100 comprise DABCO, the second ligands 108 comprise TPA, the sacrificial metal centers 102 comprise Zn, and the metal active sites 104 comprise Fe or another transition metal, pyrolysis may take place at a temperature in a range from about 800-1200° C., and more typically from 900-1200° C. After pyrolysis and evaporation of the sacrificial metal centers 102, the non-platinum group metal electrocatalyst 114 may comprise less than about 1 wt. % Zn.

In an example where the first ligands 106 of the ADP 100 comprise DABCO, the second ligands 108 comprise TPA, the sacrificial metal centers 102 comprise Cd, and the metal active sites 104 comprise Fe or another transition metal, pyrolysis may take place at a temperature in a range from about 650-1200° C., and more typically from 650-900° C. After pyrolysis and evaporation of the sacrificial metal centers 102, the non-platinum group metal electrocatalyst 114 may comprise less than about 1 wt. % Cd.

EXAMPLES

1A. Synthesis of Fe-Based ORR Catalysts Utilizing Cd as a Sacrificial Metal

In this example, an Fe-based ORR catalyst is synthesized from a mixture of ADP precursors comprising DABCO, TPA, Cd cations (specifically $Cd(NO_3)_2 \cdot 4H_2O$), and Fe cations (specifically $Fe(NO_3)_3 \cdot 9H_2O$).

The ADP precursors are dissolved and reacted in dimethylformamide (DMF) at 150° C. to generate dual-ligated ADPs which may be referred to as Fe-containing Cd-DABCO-TPA ADPs. These ADPs subsequently undergo pyrolysis under $NH_3$ at 750° C. to produce Fe-based non-PGM ORR electrocatalysts, which may be referred to as Fe—C—$N_{750}$ electrocatalysts, where the subscript refers to the pyrolysis temperature. During the pyrolysis step, as described above, the ADPs decompose to form carbon-based non-PGM catalysts. The low pyrolysis temperature, which is enabled by the use of Cd cations instead of Zn cations as in the conventional ZIF-8 MOF, is believed to promote the generation of Fe single atoms instead of Fe nanoparticles, which may form if the temperature is excessively high. For comparison, a conventional electrocatalyst (referred to as a "ZIF-8/Fe catalyst") is synthesized from ZIF-8 by pyrolysis at 750° C. using procedures known in the art.

1B. Characterization of the Fe-Based ORR Catalysts

Figure 2A:
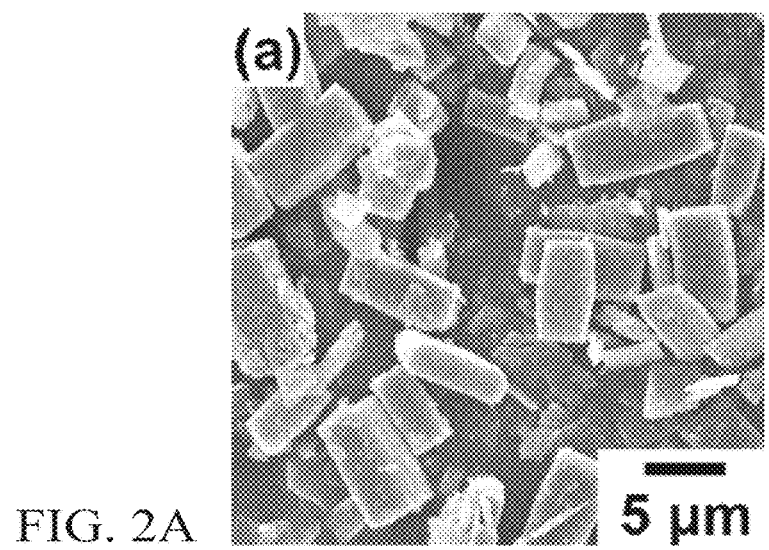
FIG. 2A is a scanning electron microscopy (SEM) image of an iron-containing ADP.
Figure 2B:
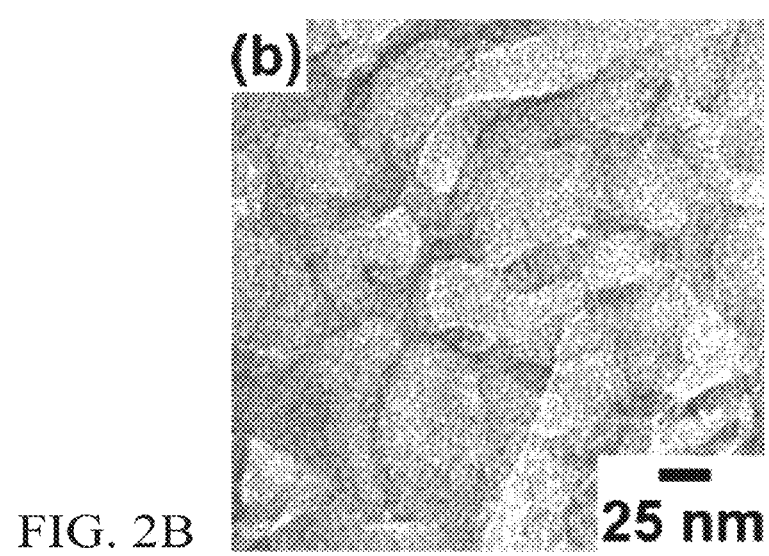
FIG. 2B is a transmission electron microscopy (TEM) image of an Fe-based ORR electrocatalyst synthesized at a pyrolysis temperature of 750° C. from a support-free ADP comprising O-containing ligands, N-containing ligands, Cd cations, and Fe cations.
Figure 2C:
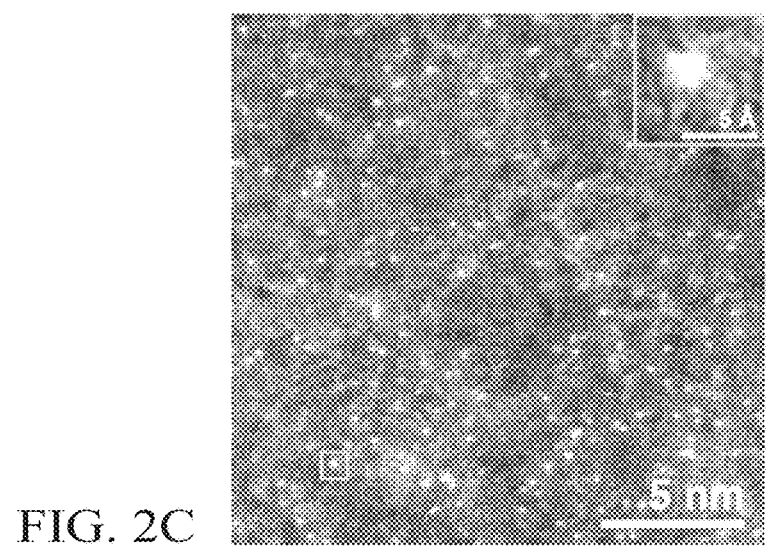
FIG. 2C is a scanning transmission electron microscopy (STEM) image of thin regions of the Fe-based ORR electrocatalyst of FIG. 2B, showing single Fe atoms.

The scanning electron microscopy (SEM) image of FIG. 2A shows that the as-synthesized Fe-containing Cd-DABCO-TPA ADP exhibits an orthorhombic crystal morphology with a long edge length of about 5 μm to 7 μm. Transmission electron microscopy (TEM) reveals that the ADP crystals transform into flake-like electrocatalysts after the pyrolysis step, as shown in FIG. 2B. Scanning transmission electron microscopy (STEM) imaging of thin regions of the Fe—C—$N_{750}$ electrocatalyst, as shown in FIG. 2C, reveals the presence of a large number of single Fe atoms. The Fe atoms are identified in the STEM images by their high contrast and diameter (~1 Å), as shown by the inset of FIG. 2C.

Inductively coupled plasma mass spectrometry (ICP-MS) analysis reveals a near complete removal of Cd after pyrolysis, with the Fe—C—$N_{750}$ catalyst comprising only about 0.4 wt. % of Cd; in contrast, in the comparative ZIF-8/$Fe_{750}$ sample, 15.4 wt. % of Zn is present after the same processing conditions. Brunauer-Emmet-Teller (BET) analysis shows that the Fe—C—$N_{750}$ catalyst exhibits a specific surface area of 431 $m^2\ g^{-1}$, which is more than double that of the ZIF-8/$Fe_{750}$ reference electrocatalyst (203 $m^2\ g^{-1}$). The formation of a high surface area electrocatalyst is facilitated by near-complete evaporation of the sacrificial metal during pyrolysis.

Mössbauer spectroscopy and X-ray photoelectron spectroscopy (XPS) are used to examine the structural details of the Fe—C—$N_{750}$ catalyst, especially the atomic environments of the Fe active metal centers.

Figure 3A:
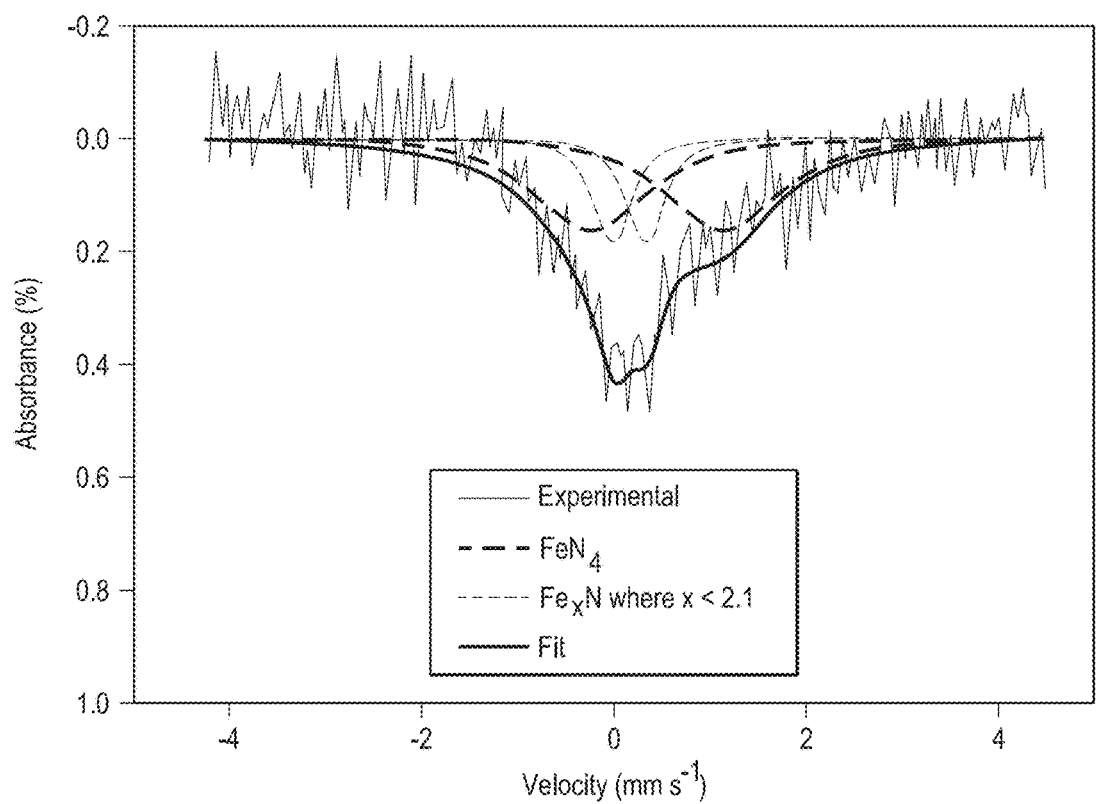
FIG. 3A shows Mossbauer spectroscopy data for the Fe-based ORR electrocatalyst.

Referring to FIG. 3A, the Mossbauer spectroscopy data show that the Fe—C—$N_{750}$ catalyst exhibited two sets of doublets, which correspond to single-atom Fe in the $FeN_4$ functional group and the $Fe_2N$ species, respectively. Iron-nitrogen is also found to be the only type of detectable Fe-containing structure. Vibrating-sample magnetometry (VSM) is carried out to determine if the electrocatalysts contain nanoparticles of reduced Fe species. The results show no obvious magnetic hysteresis and exceptionally low saturation magnetization, indicating a lack of magnetic species present in the sample; this suggests that formation of nanoparticles of reduced Fe species is suppressed in this low-temperature process.

Figure 3B:
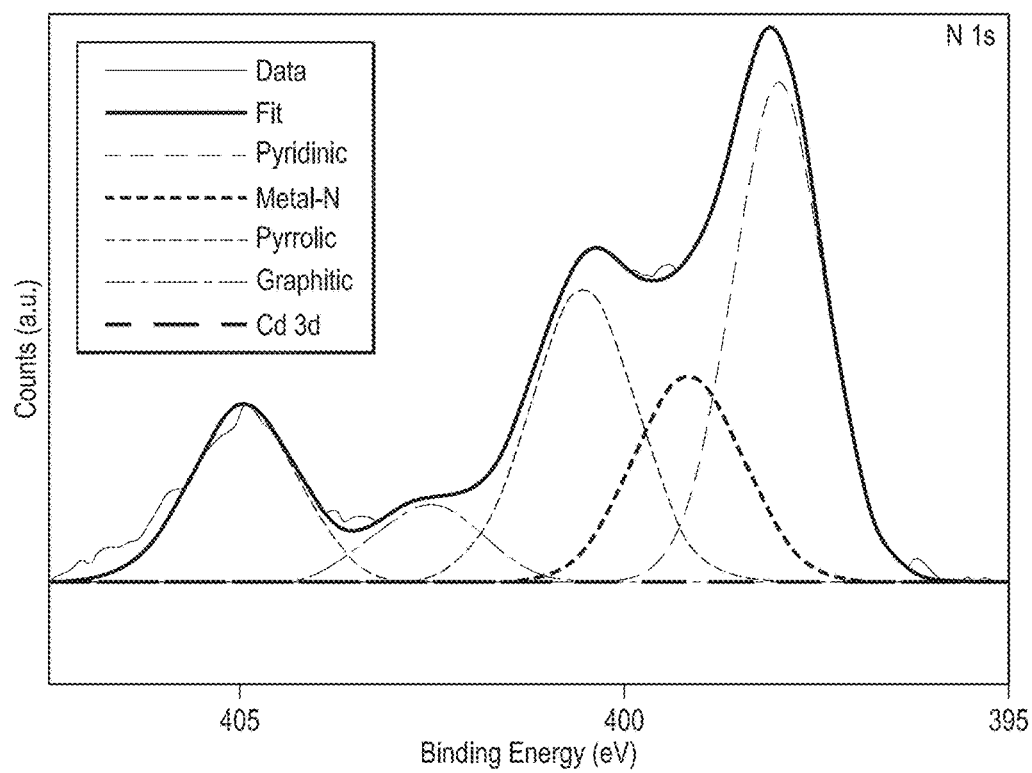
FIG. 3B shows X-ray photoelectron spectroscopy (XPS) data for the Fe-based ORR electrocatalyst.

Referring to FIG. 3B, XPS, which is used to characterize the Fe—N species in the Fe—C—$N_{750}$ catalyst, reveals nitrogen peaks indicative of the pyridinic and pyrrolic species. Such types of iron-nitrogen structures may contribute to the high activity observed in the non-PGM catalysts. The presence of metal-nitrogen peaks is indicative that single atomic moieties are well coordinated to form active sites.

1C. Electrochemical Performance of the Fe-Based ORR Catalysts

The ORR activities of the Fe—C—$N_{750}$ electrocatalyst and the ZIF-8/$Fe_{750}$ reference catalyst are evaluated by the three-electrode rotating disk electrode (RDE) technique.

Figure 4A:
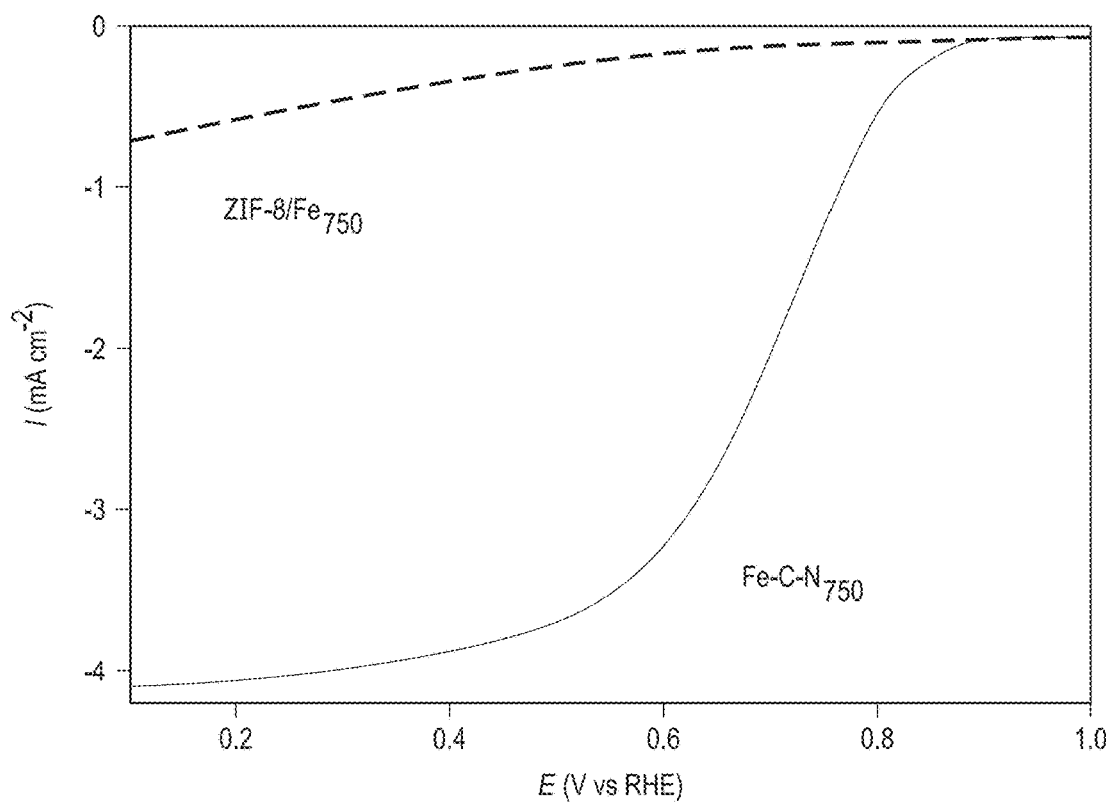
FIG. 4A shows a staircase voltammogram for the Fe-based ORR electrocatalyst ("Fe—C—$N_{750}$") and a reference electrocatalyst ("ZIF-8/$Fe_{750}$") formed from zeolitic imidazolate framework under the same conditions, both made from carbon support-free ADPs.
Figure 4B:
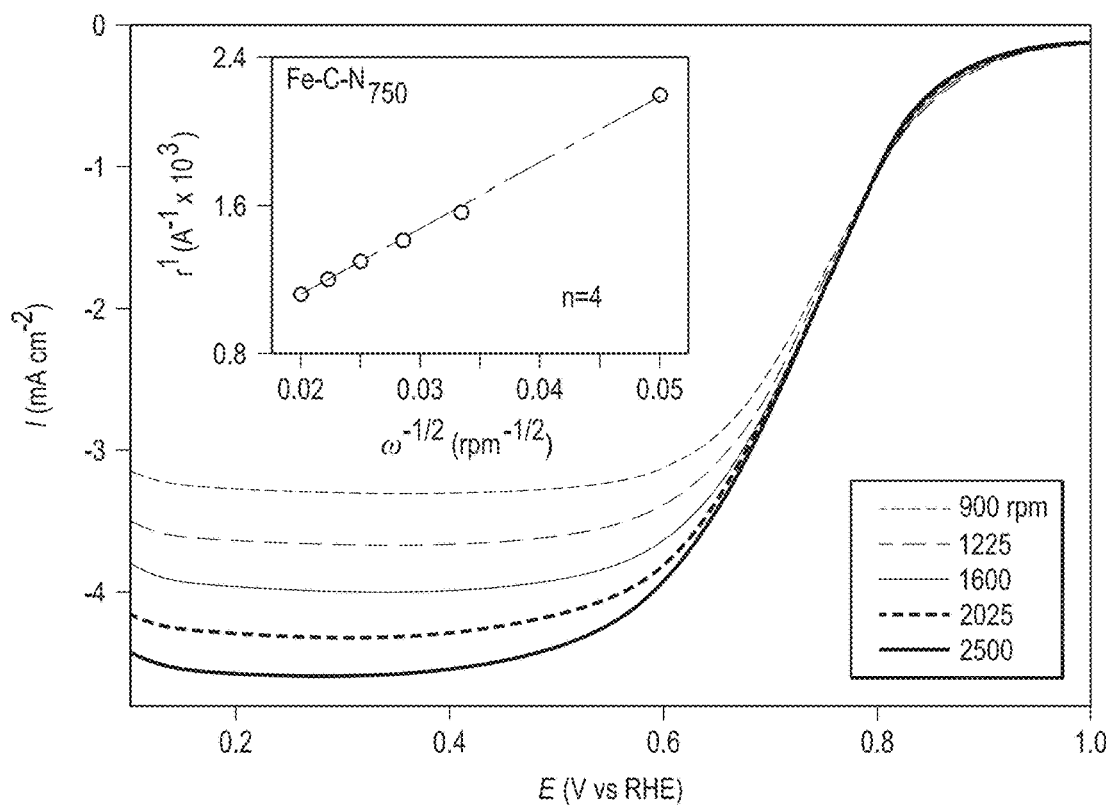
FIG. 4B shows a Koutecky-Levich analysis of the Fe-based ORR electrocatalyst ("Fe—C—$N_{750}$").

FIG. 4A shows the staircase voltammogram of these two non-PGM ORR catalysts. The Fe—C—$N_{750}$ catalyst exhibits an onset potential ($E_{onset}$) of 0.84 V and half-wave potential ($E_{1/2}$) of 0.70 V in the RDE testing. In comparison, the ZIF-8/$Fe_{750}$ reference catalyst is essentially inactive. This result is consistent with the observation that catalyst activation requires the removal of most of the sacrificial metal. Koutecky-Levich analysis indicates that the Fe—C—$N_{750}$ electrocatalyst undergoes a four-electron pathway in the ORR, as shown in FIG. 4B. These results reveal the choice of sacrificial metal plays an important role in determining the ORR performance of the non-PGM electrocatalysts synthesized at a low pyrolysis temperature. It appears that the use of Cd as a sacrificial metal may facilitate formation of a carbon matrix with a larger surface area. The high surface area and near-complete removal of the sacrificial metal are believed to contribute to easy access of active sites for the non-PGM ORR catalyst, thereby leading to enhanced activity for the Fe—C—$N_{750}$ electrocatalyst compared to the ZIF-8/Fe reference catalyst.

2A. Synthesis of Fe-Based ORR Catalysts Using Zn as a Sacrificial Metal

In this example, an Fe-based ORR electrocatalyst is synthesized from a mixture of ADP precursors comprising DABCO, TPA, Zn cations (e.g., $Zn(NO_3)_2 \cdot 6H_2O$), and Fe cations (e.g., $Fe(NO_3)_3 \cdot 9H_2O$). Carbon particles are added to the mixture to immobilize dual-ligated ADPs on a carbon support prior to thermal treatment to form the electrocatalyst.

The immobilization process involves dispersing the ADP precursors in DMF with carbon particles (e.g., Ketjen Black) at 150° C. The ADPs may be referred to as Fe-containing Zn-DABCO-TPA ADPs. After immobilization, Fe-based non-PGM ORR electrocatalysts are produced by high-temperature pyrolysis under Ar atmosphere at various temperatures. A high-temperature thermal treatment is beneficial for generating a graphitic carbon matrix and transferring the active metal coordination structure into nitrogen-anchored single iron atom sites. The synthesized catalysts are referred to as $Fe/C_T$ electrocatalysts, where the subscript T refers to the pyrolysis temperature (e.g., 950° C.). For comparison, non-PGM electrocatalysts are synthesized using the same procedure but omitting the addition of carbon (i.e., without the carbon support); these samples are referred to as $Fe_T$, where the subscript T refers to the pyrolysis temperature as above.

2B. Characterization of the Fe-Based ORR Catalysts

Figure 5A:
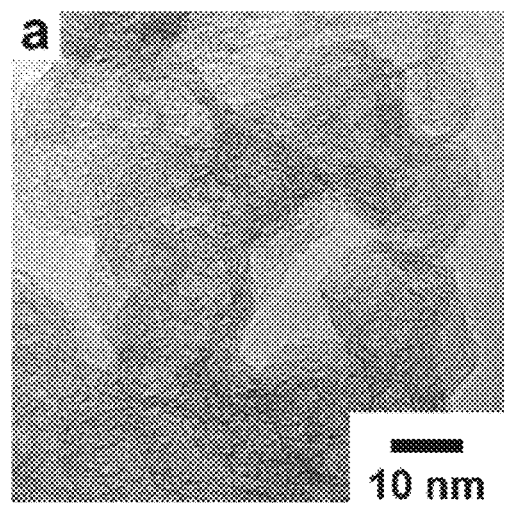
FIG. 5A is a TEM image of an Fe-based ORR electrocatalyst synthesized at a pyrolysis temperature of 950° C. from a carbon-supported ADP comprising O-containing ligands, N-containing ligands, Zn cations, and Fe cations.

SEM images reveal that the $Fe/C_{950}$ electrocatalyst exhibits an orthorhombic crystal morphology with a long edge length of about 1 μm to 2 μm. Referring to FIG. 5A, TEM images of the $Fe/C_{950}$ catalyst show a highly porous, amorphous carbon network or matrix. Porosity in the carbon matrix is believed to be crucial to obtaining the high surface area needed to accommodate more metal active sites.

Figure 5B:
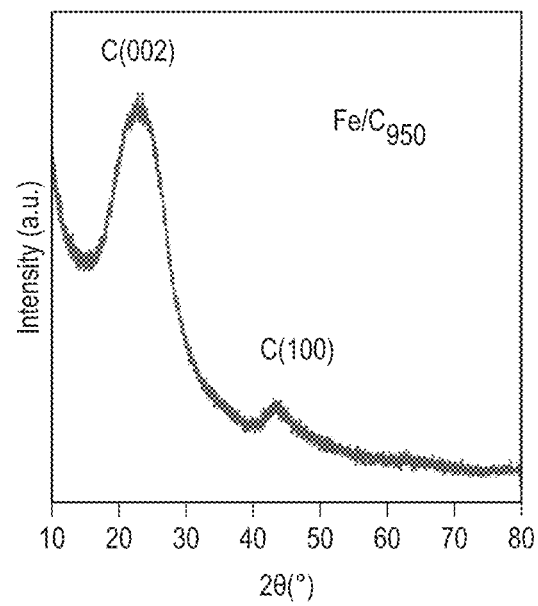
FIG. 5B is a powder x-ray diffraction pattern obtained from the Fe-based ORR electrocatalyst ("Fe/$C_{950}$") of FIG. 5A that reveals the absence of metallic iron nanoparticles in the catalyst structure.

Aberration-corrected STEM imaging coupled with electron energy loss spectroscopy (EELS) is used to investigate the atomic dispersion and local environment of Fe at an atomic scale. Distinguishable signals for C, N, O and Fe are observed in the EELS maps across the carbon network. A high density of iron doping is evident from contrast in high-angle annular dark-field imaging (HAADF)-STEM images, which show bright dots corresponding to single metal atoms that are highly dispersed in the carbon network. The co-existence of N and Fe within this graphitic carbon matrix provides strong evidence for the existence of an Fe—N coordination structure, where single iron cations are anchored by nitrogen within the carbon matrix. The powder x-ray diffraction (PXRD) pattern shown in FIG. 5B reveals the absence of metallic iron nanoparticles in the $Fe/C_{950}$ electrocatalyst. Specifically, the PXRD pattern shows two broad peaks for the $Fe/C_{950}$ catalyst which are matched with the C (002) and C (100) plane, respectively. For the $Fe_{90}$ catalyst, prepared without the carbon support, two additional characteristic peaks of (undesirable) iron nanoparticles appear at 2θ values of 44.3° and 63.6°.

As mentioned above, additional $Fe_{950}$ catalysts are synthesized under the same reaction conditions as the $Fe/C_{950}$ catalysts but without the carbon support. In these examples, the active metal atoms tend to aggregate together, forming nanoparticles after the ADP structure decomposes. High-resolution microscopy shows highly disordered amorphous carbon structures with a large amount of metal nanoparticles, as with ZIF-8-derived electrocatalysts. Thus, the immobilization strategy can enhance dispersion of the ADPs and effectively repress sintering of active metal atoms during high temperature pyrolysis. Nitrogen additives (N-containing ligands) may serve as a bridge to connect the carbon support and the active metal center in the ADP. After decomposition of the dual ligands, the bridge interaction can balance the attraction of neighboring active metal atoms, thereby helping to maintain single-atom active sites and their activity and stability.

Figure 6:
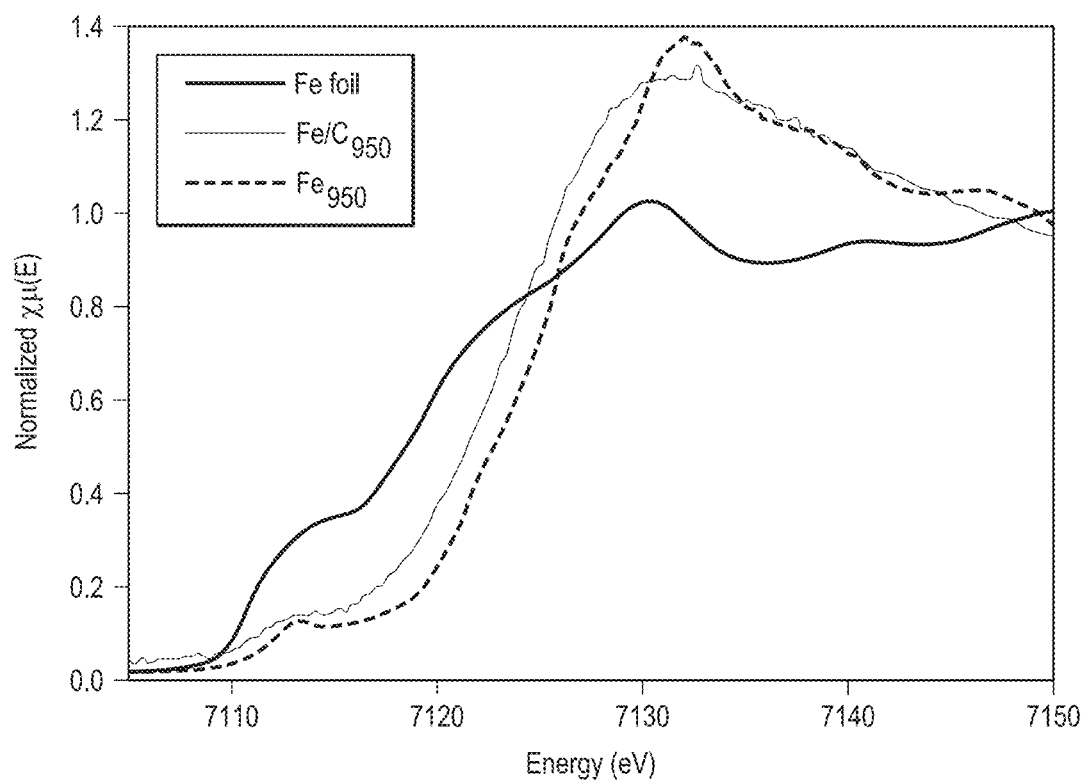
FIG. 6 shows X-ray adsorption near-edge spectroscopy data of the Fe K-edge region for Fe-based ORR electrocatalysts ("Fe/$C_{950}$," "$Fe_{950}$") formed from supported- and unsupported ADPs.
Figure 7A:
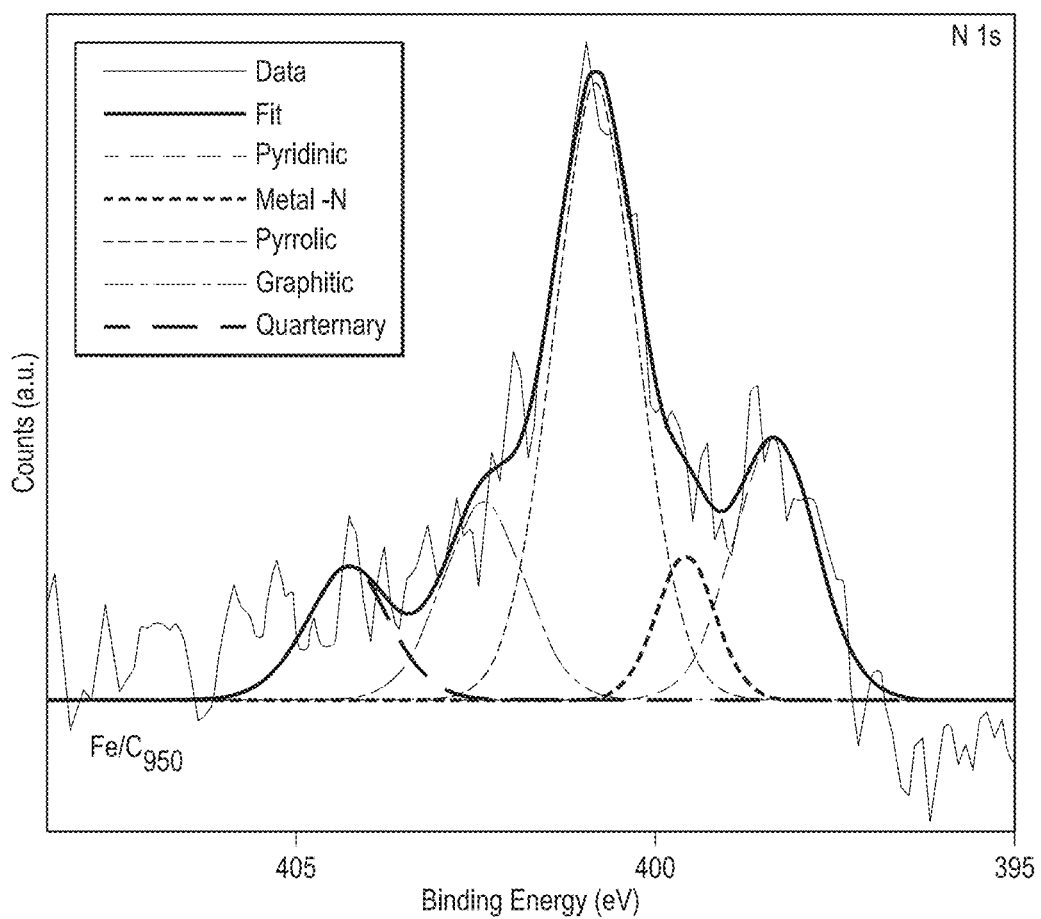
FIGS. 7A and 7B show X-ray photoelectron spectroscopy (XPS) data of the nitrogen 1s region of Fe-based ORR electrocatalysts ("Fe/$C_{950}$," "$Fe_{950}$") formed from ADPs immobilized on a support (FIG. 7B) and without a support (FIG. 7A).
Figure 7B:
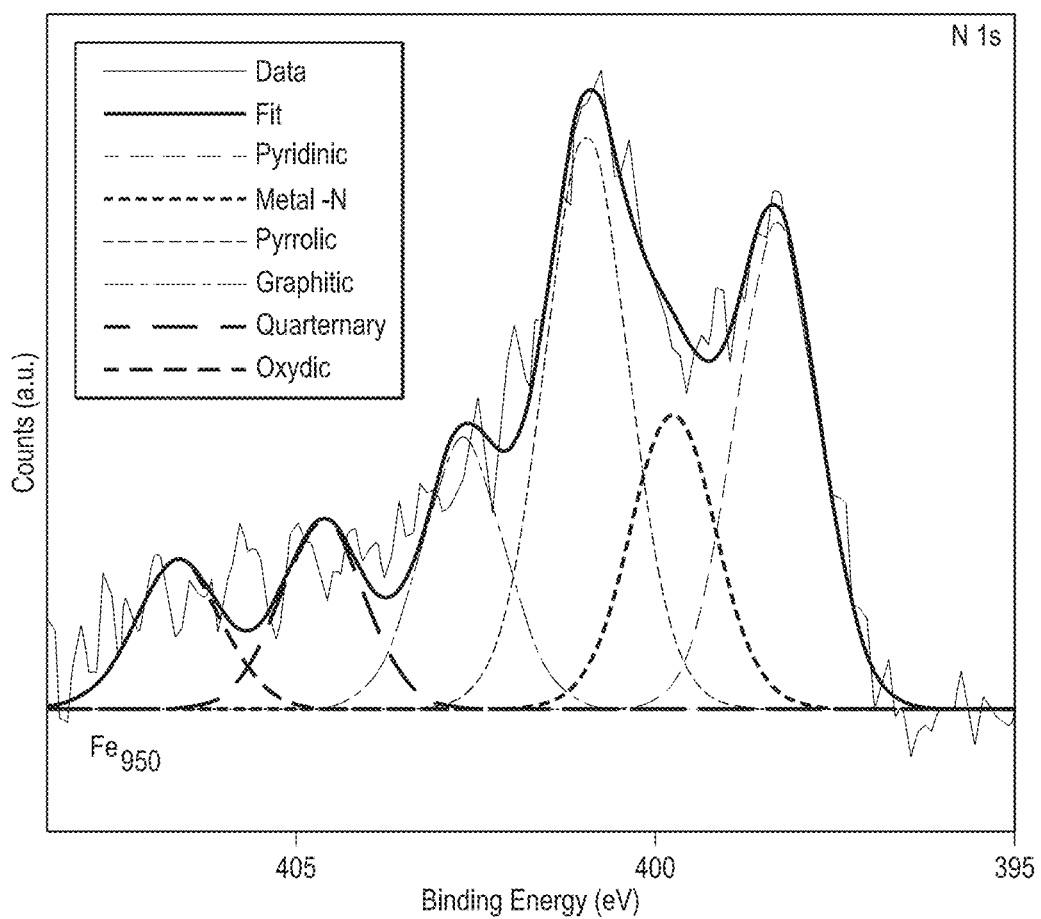

X-ray adsorption near-edge spectroscopy (XANES) is used to study the oxidation states of the single-atom active metal centers in the non-PGM catalysts. FIG. 6 shows the XANES of the Fe K-edge region for the $Fe/C_{950}$ and $Fe_{950}$ electrocatalysts and the corresponding references. The results indicate that the oxidation states of Fe single atoms in these electrocatalysts lie in between 0 (Fe foil) and +2 (FeO) or +3 ($Fe_2O_3$). XPS is used to characterize the nitrogen binding present in the electrocatalysts. Referring to the x-ray photoelectron spectroscopy (XPS) data of FIGS. 7A and 7B, respectively, the $Fe_{950}$ and the $Fe/C_{950}$ catalysts show nitrogen peaks indicative of the pyridinic and pyrrolic species, which are associated with high activity in non-PGM catalysts. The presence of metal-nitrogen peaks in both the $Fe/C_{950}$ and $Fe_{950}$ electrocatalysts is indicative that single atomic moieties are strongly coordinated.

2C. Electrochemical Performance of the Fe-Based ORR Catalysts

Figure 8A:
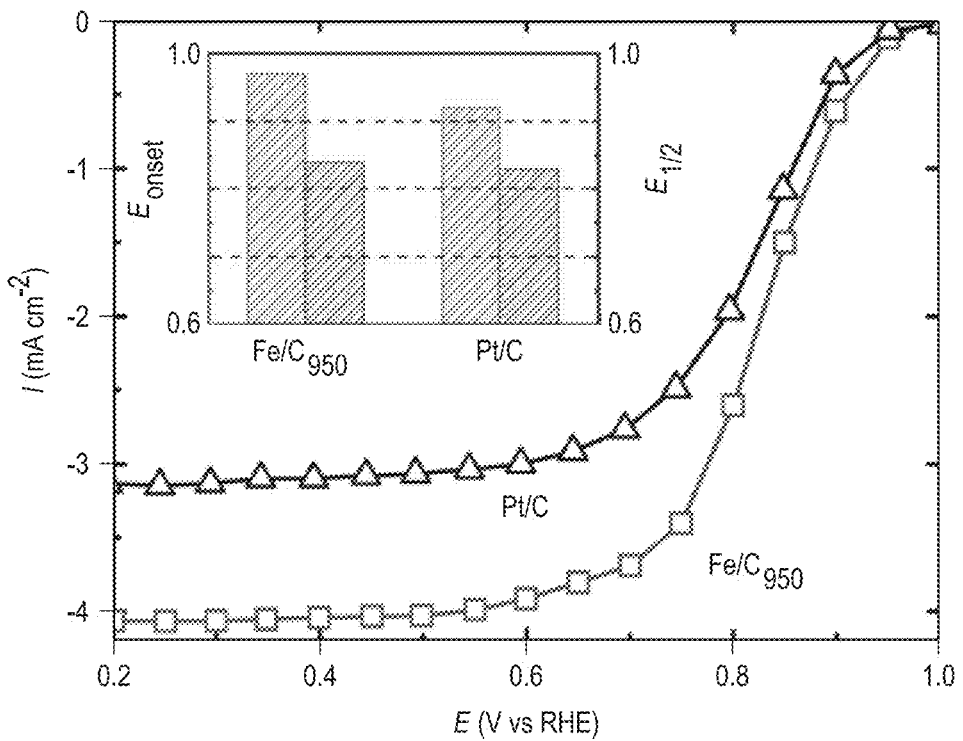
FIG. 8A shows a comparison of ORR performance between an Fe-based ORR electrocatalyst ("Fe/$C_{950}$") and a platinum-group electrocatalyst ("Pt/C"), both supported on carbon.
Figure 8B:
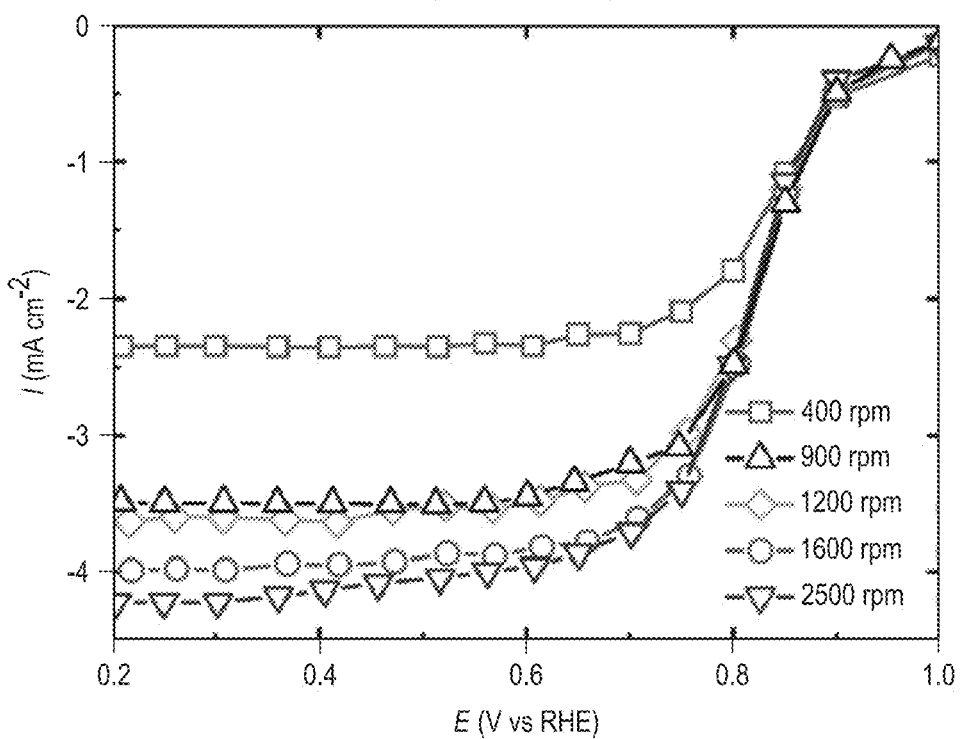
FIG. 8B shows Koutecky-Levich analysis of the Fe/$C_{950}$ electrocatalyst.

Fe-based ORR electrocatalysts are made at different pyrolysis temperatures from the Fe-containing Zn-DABCO-TPA ADPs. The ORR activities of the $Fe/C_T$ catalyst (prepared with carbon support) and $Fe_T$ catalyst (prepared without carbon support) are evaluated by the three-electrode RDE technique in a 0.1 M $HClO_4$ electrolyte. The improved dispersion of metal active sites obtained with the $Fe/C_T$ catalyst, which may be attributed to the incorporation of dual ligands and the immobilization strategy prior to thermal treatment, leads to significantly enhanced activity, which may be superior to commercial Pt/C catalysts. FIG. 8A shows a comparison of ORR performance between $Fe/C_{950}$ (E=0.84 V) and Pt/C (E=0.83 V) catalysts from tests carried out in 0.1 M $HClO_4$ at 900 rpm. FIG. 8B shows Koutecky-Levich analysis of $Fe/C_{950}$. This $Fe/C_{950}$ catalyst exhibits the onset potential ($E_{onset}$) of 0.97 V and $E_{1/2}$ up to 0.84 V versus the reversible hydrogen electrode (RHE).

During the conversion process of the ADP to the $Fe/C_T$ electrocatalyst, it is believed that two main reaction steps occur. The first step involves decomposition of the ADP, which allows for removal of volatile organic linkers and which may occur in a range from about 150° C. to 550° C. In the second step, a highly graphitic carbon matrix or network tends to form as temperature increases to the pyrolysis temperature. When the temperature reaches a critical point, which may be described as the lowest temperature at which evaporation of the sacrificial metal can occur, the second reaction begins until the sacrificial metal is completely (or nearly completely) removed.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A non-platinum group metal electrocatalyst precursor comprising:
    an atomically dispersed precursor (ADP) consisting of:
        sacrificial metal centers comprising a sacrificial metal selected from the group consisting of: Cd and Zn;
        metal active sites comprising a transition metal; and
        first and second ligands linking the sacrificial metal centers and the metal active sites into a network; and
    a carbon support, the ADP being immobilized on the carbon support.

2. The non-platinum group metal electrocatalyst precursor of claim 1, wherein the carbon support comprises crystalline carbon, graphite, graphene, graphene oxide, carbon nanotubes, atom-doped carbon, N-doped carbon, amorphous carbon, and/or mesoporous carbon.

3. The non-platinum group metal electrocatalyst precursor of claim 1, wherein the first ligands comprise N-containing ligands.

4. The non-platinum group metal electrocatalyst precursor of claim 3, wherein the first ligands comprise 1,4-diazabicyclo[2.2.2]octane (DABCO) or 1,10-phenanthroline.

5. The non-platinum group metal electrocatalyst precursor of claim 1, wherein the second ligands have a different carbon chain length than the first ligands.

6. The non-platinum group metal electrocatalyst precursor of claim 1, wherein the second ligands comprise O-containing ligands.

7. The non-platinum group metal electrocatalyst precursor of claim 6, wherein the O-containing ligands comprise terephthalic acid (TPA).

8. The non-platinum group metal electrocatalyst precursor of claim 1, wherein the transition metal is selected from the group consisting of Fe, Co, Ni, and Mn.

9. The non-platinum group metal electrocatalyst precursor of claim 1 fabricated from a mixture of N-containing ligands, O-containing ligands, an Fe or Co salt, and a Cd salt.

10. The non-platinum group metal electrocatalyst precursor of claim 1 fabricated from a mixture of N-containing ligands, the second ligands, an Fe or Co salt, and a Zn salt.

11. The non-platinum group metal electrocatalyst precursor of claim 1, wherein the carbon support comprises carbon particles.

12. The non-platinum group metal electrocatalyst precursor of claim 11, wherein the ADP is mixed with the carbon particles.

* * * * *